United States Patent [19]

Kutsuwa et al.

[11] Patent Number: 4,588,855

[45] Date of Patent: May 13, 1986

[54] SEMICONDUCTING COMPOSITIONS AND WIRES AND CABLES USING THE SAME

[75] Inventors: Yoshikazu Kutsuwa; Kouji Kitahara; Toshiyuki Ishii, all of Ichihara, Japan

[73] Assignee: DuPont-Mitsui Polychemicals Co., Ltd., Tokyo, Japan

[21] Appl. No.: 723,293

[22] Filed: Apr. 15, 1985

Related U.S. Application Data

[62] Division of Ser. No. 562,727, Dec. 19, 1983, Pat. No. 4,526,707.

[30] Foreign Application Priority Data

Jun. 13, 1983 [JP] Japan .................. 58-105588
Oct. 17, 1983 [JP] Japan .................. 58-193892

[51] Int. Cl.$^4$ .................. H01B 7/00; H01B 1/06
[52] U.S. Cl. .................. 174/120 SC; 252/511; 524/495; 524/496; 428/372; 428/383
[58] Field of Search .................. 174/120 SC, 102 SC, 174/105 SC, 102 SP, 110 PM; 252/511; 524/495, 496, 500, 515, 524; 428/375, 378, 364, 372, 383

[56] References Cited

U.S. PATENT DOCUMENTS

| 4,150,193 | 4/1979 | Burns | 252/511 |
| 4,200,973 | 5/1980 | Farhus | 252/511 |
| 4,246,140 | 1/1981 | Ongchia | 252/511 |
| 4,395,362 | 7/1983 | Satoh | 252/511 |
| 4,412,938 | 11/1983 | Kakizaki et al. | 174/120 SC |
| 4,435,613 | 3/1984 | Caubert | 174/102 SC |
| 4,493,787 | 1/1985 | Taniguchi et al. | 174/102 SC |

Primary Examiner—Josephine L. Barr
Attorney, Agent, or Firm—Wenderoth, Lind & Ponack

[57] ABSTRACT

A semiconducting composition comprising
(A) a random copolymer of propylene and an alpha-olefin having at least 4 carbon atoms as main constituents, which contains 50 to 87 mole % of the propylene units,
(B) fine particles of carbon black, and as an optional component,
(C) at least one random copolymer selected from the group consisting of a random copolymer of ethylene and a vinyl ester having 4 or 5 carbon atoms as main constituents, which contains at least about 5.4 mole % of the vinyl ester units, and a random copolymer of ethylene and an unsaturated carboxylic acid ester having 4 to 8 carbon atoms as main constituents, which contains at least 3 mole % of the unsaturated carboxylic acid ester units.

The semiconducting composition or its crosslinked product is useful as an outside semiconducting layer in a power cable composed at least of a central conductor, a crosslinked polyethylene insulating layer surrounding the conductor and an outside semiconducting layer surrounding the insulating layer.

2 Claims, No Drawings

SEMICONDUCTING COMPOSITIONS AND WIRES AND CABLES USING THE SAME

This is a divisional application of application Ser. No. 562,727, filed Dec. 19, 1983, now U.S. Pat. No. 4,526,707.

This invention relates to a semiconducting composition. More specifically, it relates to a semiconducting composition suitable for use as a material for forming an outside semiconducting layer of a high voltage power cable having a polyethylene insulating layer (to be referred to as a crosslinked polyethylene-insulated high-voltage power cable).

In a conventional crosslinked polyethylene-insulated high-voltage power cable, an inside and an outside semiconducting layer are provided inwardly and outwardly of the crosslinked polyethylene insulating layer in order to prevent degradation by a corona discharge which occurs in the space between a central conductor and the crosslinked polyethylene insulating layer and the space between the polyethylene layer and a shielding layer. These semiconducting layers should adhere well to the crosslinked polyethylene layer and have good surface smoothness in view of the purpose of providing them. The recent trend is that these layers and the polyethylene insulating layer are co-extruded by the so-called multilayer co-extrusion method.

The outside semiconducting layer is peeled off from the crosslinked polyethylene insulating layer in connecting cables and processing their terminals. If the adhesion between the two layers is firm, the peeling operation becomes difficult. Forced peeling may result in injury to the polyethylene insulating layer.

A conventional material for forming the semiconducting layers is a composition typically comprising an ethylene/vinyl acetate copolymer or an ethylene/ethyl acrylate copolymer and conductive carbon black (see the specifications of Japanese Laid-Open Patent Publications Nos. 116,998/1976, 138,894/1976, 25,886/1978, 73,820/1981, 30,011/1983 and 40,707/1983). However, such a composition based on an ethylene resin adheres firmly to the crosslinked polyethylene insulating layer, and the semiconducting layer is very difficult to peel from the insulating layer. This also constitutes a marked hindrance to the operation of processing cable terminals.

In an attempt to remove such a defect, various materials for forming semiconducting layers have been proposed in the past. For example, it has been proposed to use an ethylene/vinyl acetate copolymer having a vinyl acetate content of at least 80% by weight and blends of the ethylene/vinyl acetate copolymer with a styrene-type polymer, nitrile rubber, a styrene-type rubber, polyvinyl chloride, chlorinated polyethylene, etc. (see the specifications of Japanese Patent Publication No. 32079/1977, and Japanese Laid-Open Patent Publications Nos. 84290/1979, 140,992/1979, 67108/1981 and 67109/1981), or a chlorinated ethylene/vinyl acetate copolymer or a styrene-grafted ethylene/vinyl acetate copolymer (see the specifications of Japanese Laid-Open Patent Publications Nos. 73044/1976, 37954/1977, 116,888/1977, 35306/1981 and 73812/1981). These materials, however, have other problems, such as poor flexibility, brittleness at low temperatures, and susceptibility to decomposition in the crosslinking step. Particularly, a dry crosslinking method for polyethylene has tended to gain acceptance in order to prevent its deterioration in insulating properties by water treeing. Since the dry crosslinking method uses high crosslinking temperatures, some of the aforesaid conventional materials generate halogens or cyanogen gases during the crosslinking step and degrade the performance of cables.

It is an object of this invention therefore to provide a novel semiconducting composition.

Another object of this invention is to provide a semiconducting composition having excellent flexibility, non-brittleness at low temperatures, heat stability during extrusion and extrudability.

Still another object of this invention is to provide a semiconducting composition which does not firmly adhere to polyethylene.

Yet another object of this invention is to provide a semiconducting composition having the various properties mentioned above which is suitable as an outside semiconducting layer surrounding a crosslinked polyethylene insulating layer of a power cable.

A further object of this invention is to provide a power cable comprising the semiconducting composition of this invention as an outside semiconducting layer in contact with a crosslinked polyethylene insulating layer.

Other objects and advantages of this invention will become apparent from the following description.

These objects and advantages of the invention are achieved in accordance with this invention by a semiconducting composition comprising (A) a random copolymer of propylene and an alpha-olefin having at least 4 carbon atoms as main constituents, said copolymer containing 50 to 87 mole%, based on the entire recurring units, of the propylene units, and (B) fine particles of carbon black in an amount sufficient for the composition to have a volume inherent resistivity of $10^0$ to $10^6$ ohms-cm at 23° C.

The semiconducting composition of this invention comprises the random copolymer (A) containing propylene and an alpha-olefin having at least 4 carbon atoms as main constituents. The random copolymer contains 50 to 87 mole% of propylene units based on the entire recurring units. The alpha-olefin having at least 4 carbon atoms may be linear or branched, and preferably has 4 to 8 carbon atoms. Examples of preferred alpha-olefins having at least 4 carbon atoms are 1-butene, 1-pentene, 4-methyl-1-pentene, 1-hexene and 1-octene.

The random copolymer (A) may contain a minor component such as ethylene in addition to propylene and the alpha-olefin having at least 4 carbon atoms. Preferably, the random copolymer (A) is composed substantially of propylene and the alpha-olefin having at least 4 carbon atoms, especially preferably of propylene and 1-butene as structural units.

The random copolymer (A) used in this invention can be produced by copolymerizing monomers containing propylene and the alpha-olefin having at least 4 carbon atoms using a stereospecific catalyst known per se, preferably such a stereospecific catalyst as is used in the production of isotactic polypropylene. The method of polymerization is known per se, and for example, methods of producing a preferred random copolymer composed of propylene and 1-butene are disclosed in the specifications of Japanese Patent Publication No. 11322/1982 and Japanese Laid-Open Patent Publications Nos. 128781/1975 and 748/1980.

The melting point (Tm) of the propylene/alpha-olefin random copolymer (A) used in this invention varies depending upon its propylene content, and is generally within the range of about 75° to about 140° C. If the propylene content exceeds 87 mole%, the melting point of the random copolymer (A) generally exceeds 140° C., and this causes hindrance to the operation of blending electrically conductive carbon black, particularly in the presence of a crosslinking agent, or the operation of extruding the composition. On the other hand, if the propylene content is less than 50 mole%, the melting point of the copolymer (A) generally becomes lower than 75° C., and the tensile strength of the resulting composition is reduced. Its tensile strength becomes close to its peel strength, and the peeling operation becomes difficult. Moreover, the composition becomes sticky. From this viewpoint, the copolymer most preferably has a propylene content of 60 to 85 mole%.

There is no particular restriction on the melt flow rate of the random copolymer (A). But if its melt flow rate is too high, operability is reduced in kneading and blending conductive carbon black. If it is too low, the extrudability of the composition is reduced. Preferably, therefore, the compolymer A has a melt flow rate (at 190° C. measured under condition 4 in Table 1 of JIS K-7210) of about 1 to 50 dg/minute.

If the degree of crystallization of the random copolymer (A) is too high, operations of kneading and blending and of extruding become difficult. On the other hand, if it is too low, the tensile strength of the resulting composition is reduced and the composition gives a sticky feeling. Desirably, the random copolymer (A) used in this invention has a degree of crystallization, in terms of the heat of crystal fusion, of about 10 to about 80 joules/g.

The composition of this invention comprises fine particles of carbon black (B). The carbon black particles impart semiconductivity to the composition of this invention and is included therein in an amount sufficient to give a volume inherent resistivity of $10^0$ to $10^6$ ohms-cm. The fine particles of carbon black are substantially uniformly dispersed in the composition of this invention. Preferably, the carbon black particles have a surface area of about 40 to about 1,200 $m^2/g$. Electrically conductive carbon blacks generally called acetylene black, furnace black, etc. are used as the carbon black.

The standard of the amount of carbon black which gives a volume inherent resistivity of $10^0$ to $10^6$ ohms-cm to the composition is at least about 40 parts by weight per 100 parts by weight of the copolymer when it has a specific surface area of not more than about 700 $m^2/g$. If the specific surface area is higher (for example, in the case of Ketjen Black made by Akzo Co., Ltd.), the amount of the carbon black may be smaller than about 40 parts, for example about 10 to about 30 parts by weight, per 100 parts by weight of the copolymer (A).

The composition of this invention may further include as a polymer component a random copolymer composed of ethylene and a vinyl ester having 4 or 5 carbon atoms as main constituents, the proportion of the vinyl ester units being at least about 5.4 mole% based on the entire recurring units (to be referred to as an ethylene/vinyl ester copolymer), or a random copolymer composed of ethylene and an unsaturated carboxylic acid ester having 4 to 8 carbon atoms, the proportion of the ester units being at least 3 mole% based on the entire recurring units (to be referred to as an ethylene/unsaturated carboxylic acid ester copolymer) in addition to the copolymer (A).

The vinyl ester having 4 or 5 carbon atoms are vinyl acetate, vinyl propionate or a mixture of these.

The unsaturated carboxylic acid estrer having 4 to 8 carbon atoms is preferably a lower alkyl ester of acrylic or methacrylic acid as the unsaturated carboxylic acid. Specific examples include methyl acrylate, ethyl acrylate, isopropyl acrylate, butyl acrylate, pentyl acrylate, methyl methacrylate, ethyl methacrylate, propyl methacrylate and butyl methacrylate. These unsaturated carboxylic acid esters having 4 to 8 carbon atoms may be used as a mixture.

To secure sufficient peelability from the crosslinked polyethylene insulating layer, the ethylene/vinyl ester copolymer has a vinyl ester content of at least 5.4 mole% (about 15% by weight for vinyl acetate), preferably at least 9 mole% (about 24% by weight for vinyl acetate), especially preferably at least 16 mole% (about 37% by weight for vinyl acetate). A random copolymer consisting substantially of ethylene and vinyl acetate or vinyl propionate or both as structural units is especially preferred as the ethylene/vinyl ester copolymer. Such copolymers can be obtained by generally known methods, such as radical polymerization under high pressures, or solution or emulsion polymerization under medium to atmospheric pressures.

The composition of this invention comprising the ethylene/vinyl ester copolymer as an additional polymer component particularly has excellent impact stgrength at low temperatures and flexibility. There is no particular restriction on the melt flow rate of the ethylene/vinyl ester copolymer. If it is too high, the operability of the step of kneading electrically conductive carbon black is reduced, and the strength of peeling from the crosslinked polyethylene insulating layer tends to become high. On the other hand, if it is too low, the strength of peeling from the crosslinked polyethylene layer becomes lower, but the extrudability of the composition is reduced. Usually, therefore, the ethylene/vinyl ester coplymer used in this invention has a melt flow rate (measured in accordance with condition 4 of in Table 1 of JIS K-7210) of about 1 to about 100 dg/min.

The ethylene/unsaturated carboxylic acid ester may, for example, be a copolymer of ethylene with methyl acrylate, ethyl acrylate or butyl acrylate or the corresponding alkyl methacrylates with or without a minor proportion of another comonomer. To secure superior flexibility and sufficient peelability from the crosslinked polyethylene insulating layer, the ethylene/unsaturated carboxylic acid ester copolymer contains at least 3 mole%, preferably at least 5 mole%, of the unsaturated carboxylic acid ester. A copolymer consisting substantially of ethylene and an acrylic acid ester having 4 to 8 carbon atoms, a methacrylic acid ester having 5 to 8 carbon atoms, or a mixture of these is especially preferred as the ethylene/unsaturated carboxylic acid ester copolymer used in this invention. Such copolymers can be obtained by generally known methods such as radical polymerization under high pressures, solution of emulsion polymerization under medium to atmospheric pressures.

There is no particular restriction on the melt flow rate of the ethylene/unsaturated carboxylic acid ester copolymer used in this invention. But for the same reason as given in regard to the ethylene/vinyl ester copolymer, it preferably has a melt flow rate (measured in accordance with condition 4 in Table 1 of JIS K-7210) of about 1 to about 100 dg/min.

The ethylene/unsaturated carboxylic acid ester copolymer imparts flexibility and low-temperature non-brittleness which are favorable as a semiconductor layer-forming material to the composition of this invention, and does not generate decomposition products detrimental to power cables. A semiconductor layer formed from this copolymer as a base adheres very firmly to the crosslinked polyethylene insulating layer, and is usually very difficult to peel from the polyethylene insulating layer. However, when this copolymer is incorporated in the composition of this invention containing the propylene/alpha-olefin random copolymer, the aforesaid defect can be eliminated.

The semiconducting composition of this invention may contain 10 to 100 parts by weight of the fine particles of carbon black per 100 parts by weight of the propylene/alpha-olefin random copolymer (A).

The ethylene/vinyl ester copolymer or the ethylene/unsaturated carboxylic acid ester copolymer may be included in an amount of not more than 400 parts by weight per 100 parts by weight of the random copolymer (A). Preferably, the composition of this invention containing this additional copolymer preferably contains 10 to 100 parts by weight of fine particles of carbon black per 100 parts by weight of the random copolymer (A) and the additional copolymer (C) combined.

Investigations of the present inventors have shown that in regard to peelability from the crosslinked polyethylene layer, flexibility and extrudability, a particularly preferred composition of this invention has a volume inherent resistivity of $10^0$ to $10^6$ ohms-cm at 23° C. and comprises (A) a random copolymer containing propylene and an alpha-olefin having at least 4 carbon atoms as main constituents, the copolymer containing 50 to 87 mole%, preferably 60 to 85 mole%, of the propylene units based on the entire recurring units and having a melt flow rate at 190° C. of about 10 to about 50 dg/min., (B) acetylene black and furnace black, and (C) a random copolymer containing ethylene and a vinyl ester having 4 or 5 carbon atoms as main constituents, the copolymer containing at least about 5.4 mole%, preferably at least about 16 mole%, of the vinyl ester units based on the entire recurring units, and having a melt flow rate at 190° C. of about 1 to about 10 dg/min.; and (D) the proportion of the random copolymer (C) being 150 to 400 parts by weight, preferably 180 to 300 parts by weight by weight, per 100 parts by weight of the random copolymer (A) and the proportion of aceylene black and furnace black (B) being 30 to 50 parts by weight and 20 to 40 parts by weight, respectively, per 100 parts by weight of the random copolymer (A) and the random copolymer (C) combined.

When furnace black is used in an amount of at least 20 parts by weight, the melt viscosity of the composition does not become high, and its extrudability is improved. If, however, it is used in an amount exceeding 40% by weight, the appearance of an extrudate from the resulting composition is impaired.

Another particularly preferred composition provided by this invention comprises a random copolymer containing ethylene and an unsaturated carboxylic acid ester having 4 to 8 carbon atoms, the random copoymer contains at least 3 mole%, preferably at least 12 mole%, of the unsaturated carboxylic acid ester units based on the entire recurring units and having a melt flow rate at 190° C. of about 1 to about 30 dg/min., instead of the component (C) in the above composition. In this composition, furnace black brings about the same advantage as described above.

The especially preferred compositions described above exhibit excellent extrudability as demonstrated by their melting torque of not more than 3.5 kg-m, preferably not more that 3.0 kg-cm, during kneading in a Brabender plastograph. The compositions can of course be extruded even when they have a larger melting torque. But in such a case, some ingenuity such as the selection of a crosslinking agent having a high decomposition temperature is required.

The semiconducting composition of this invention may be used after crosslinking it by including a crosslinking agent such as an organic peroxide into it. Exmples of the crosslinking agent are dicumyl peroxide, 2,5-dimethyl-2,5-bis(tert.butyl peroxy)hexyne-3, and 1,3-bis(tert.butyl peroxyisopropyl)benzene. The crosslinking agent may be included in an amount of not more than 5 parts by weight per 100 parts by weight of the propylene/alpha-olefin random copolymer (A).

To increase the strength of a shaped article from the composition of this invention further, it is desirable to incorporate a crosslinking aid in the composition. For example, a polyfunctional compound containing at least two ethylenic vinyl groups in the molecule is preferably used as the crosslinking aid. Examples of the polyfunctional compound include known polyfunctional monomers such as triallyl cyanurate, triallyl isocyanurate and triallyl trimellitate, and polyfunctional polymers such as polybutadiene.

The crosslinking aid may be included in an amount of not more than 5 parts by weight per 100 parts by weight of the propylene/alpha-olefin random copolymer (A).

As required, the composition of this invention may include stabilizers, processing aids, etc. Antioxidants, for example, may be used as the stabilizers. Examples of effective antioxidants are sterically hindered phenolic compounds such as 4,4-thiobis-(6-tert.butyl m-cresol) well known as a stabilizer for polyolefins, and high-molecular-weight phenolic stabilizers such as a combination of octadecyl 3-(3,5-ditert.butyl-4-hydroxypheyl)-propionate and a thio-ester of an aliphatic carboxylic acid (e.g., dilauryl thiodipropionate). The combination stabilizer exemplified above is especially preferred because it does not adversely affect the degree of crosslinking.

The antioxidant may be used in an amount of not more than 3 parts by weight per 100 parts by weight of the propylene/alpha-olefin random copolymer (A).

The processing aid may, for example, be a low-molecular-weight compound such as polyethylene wax, paraffin wax and carboxylic acid wax. These compounds are effectively used as viscosity regulating agents or dispersing aids for the composition.

The composition of this invention can be prepred by melt-blending the individual ingredients simultaneously or consecutively in a batchwise kneader such as a mixing roll, a Banbury mixer, a Brabender plastograph or a pressure kneader or a single or twin screw extruder. In the case of the consecutive blending, it is possible to use a method which comprises melt-blending the ethylene/vinyl ester copolymer and conductive carbon black, dry-blending the resulting blend with the propylene/alpha olefin random copolymer, and extruding the resulting blend to form a semiconducting layer of a final composition.

The semiconducting composition of this invention is used mainly as an outside semiconducting layer of high-voltage power cables insulated by crosslinked polyethylene, and is also useful for panel heaters.

When the composition of this invention is used as an outside semiconducting layer, it may be simultaneously extruded with a composition for forming an inside semiconducting layer and a composition for forming an insulating layer. Or it may be co-extruded with the insulating composition onto a central conductor through an inside semiconducting layer.

Thus, according to this invention, there is provided a power cable at least comprising a central conductor, a crosslinked polyethylene insulating layer surrounding it and an outside semiconducting layer surrounding the insulating layer, the outside semiconducting layer being composed of the composition of this invention or its crosslinked product.

Since this cable has an outside semiconducting layer composed of the composition of this invention, it is protected from deterioration by a corona discharge and can be easily peeled off from the crosslinked polyethylene layer in processing cable terminals.

The following examples illustrate the present invention further more specifically.

EXAMPLES 1 TO 13 AND COMPARATIVE EXAMPLES 1 AND 2

(1) Ingredients and preparation of composition

The following ingredients were used in the proportions indicated in Tables 1 and 2, and kneaded on a 6-inch mixing roll whose surface temperature was kept at 120° C. to prepare semiconducting compositions.

The following three propylene/1-butene random copolymer prepared by the method described in the specification of Japanese Patent Publication No. 11,322/1982 were used.

Propylene/1-butene random copolymer I (propylene content 60 mole% determined by the NMR method; melting point 110° C.; heat of crystal fusion 50 joules/g; melt flow rate at 190° C. 3.1 dg/min.);

propylene/1-butene random copolymer II (propylene content 85 mole% determined by the NMR method; melting point 136° C.; heat of crystal fusion 75 joules/g; melt flow rate at 190° C. 1.5 dg/min.); and propylene/1-butene random copolymer III (propylene content 55 mole% determined by the NMR method; melting point 85° C.; heat of crystal fusion 28 joules/g; melt flow rate at 190° C. 1.2 dg/min.).

The following five ethylene/vinyl acetate copolymers were used.

Ethylene/vinyl acetate copolymer I (Evaflex 45LX, a product of Mitsui Polychemical Co., Ltd.; vinyl acetate content 21 mole% (45% by weight); melt flow rate at 190° C. 2 dg/min.), ethylene/vinyl acetate copolymer II (Evaflex 40LX, a product of Mitsui Polychemical Co., Ltd.; vinyl acetate content 17.8 mole% (4% by weight); melt flow rate at 190° C. 2 dg/min.), ethylene/vinyl acetate copolymer III (Evaflex 170, a product of Mitsui Polychemical Co., Ltd.; vinyl acetate content 13.8 mole% (33% by weight); melt flow rate at 190° C. 2 dg/min.), ethylene/vinyl acetate copolymer IV (Evaflex P-2505, a product of Mitsui Polychemical Co., Ltd.; vinyl acetate content 4.8 mole% (25% by weight); melt flow rate at 190° C. 2 dg/min.), and ethylene/vinyl acetate copolymer V (Evaflex P-1905, a product of Mitsui Polychemical Co., Ltd.; vinyl acetate content 7.1 mole% (19% by weight; melt flow rate at 190° C. 2.5 dg/min.).

The following ingredients were also used.

Conductive carbon black: acetylene black (Denka Black, a product of Denki Kagaku Kogyo K.K.).

Crosslinking agent: dicumyl peroxide (Mitsui DCP, a product of Mitsui Petrochemical Ind., Co., Ltd.).

Stabilizer: 4,4'-thiobis(3-methyl-6-t-butylphenol (Yoshinox SR, a product of Yoshitomi Pharmaceutical Co., Ltd.).

(2) Preparation and testing of samples

Each of the semiconducting compositions was compression-molded at 170° C. and 100 kg/cm$^2$ to form samples having a thickness of 2 mm. These samples were tested for the following properties.

Rigidity modulus of elasticity: Measured at 23° C. by the method of testing rigidity modulus of elasticity in JIS K-6730 4.3.

Brittle temperature: The temperature at which one half of twenty samples broke was determined by the method of testing cold resistance according to JIS K-6760 4.6, and defined as the brittle temperature.

Volume inherent resistivity: A sample cut to a width of 25 mm was set between metal electrodes spaced by a distance of about 115 mm. The resistance was directly read by a digital multimeter, and converted to a volume resistivity value.

(3) Preparation and testing of a bonded sample

One hundred parts by weight of low-density polyethylene (MIRASON ®9, a product of Mitsui Polychemical Co., Ltd.; density 0.921 g/cm$^3$; melt flow rate 1.5 dg/min.) was kneaded with 2 parts by weight of dicumyl peroxide and 0.2 part by weight of a stabilizer (Yoshinox SR) on a 6-inch roll to form a composition for an insulating layer.

The composition and the semiconducting composition prepared in (1) above were each molded by a compression-molding machine at 120° C. to obtain press sheets having a thickness of 1 mm. The sheets were super imposed and pre-heated at 120° C. for 3 minutes, and then pressed for 3 minutes under a pressure of 30 kg/cm$^2$ to bond them provisionally. The provisionally bonded sheet was press-formed at 170° C. and 30 kg/cm$^2$ for 10 minutes to prepare a crosslinked bonded sample. The bonded sample was tested for peelability as follows:

The sample was cut to a width of 25 mm and peeled between the insulating layer and the semiconducting layer by a tensile tester at a speed of 100 mm/min. The force required to effect peeling was determined.

(4) Results

The results obtained in (2) and (3) above were shown in Tables 1 and 2. It is seen from these tables that the layers formed of the semiconducting compositions of this invention can be easily peeled from the crosslinked polyethylene insulating layer, have moderate flexibility, and do not show brittleness at low temperatures. Hence, they have superior characteristics as a material for forming an outside semiconducting layer of crosslinked polyethylene-insulated high-voltage power cables.

TABLE 1

| Example | 1 | 2 | 3 | 4 | 5 | 6 | 7 | 8 |
|---|---|---|---|---|---|---|---|---|
| Ingredients (parts by weight) | | | | | | | | |
| Propylene/1-butene copolymer I | 100 | 80 | 60 | 50 | 40 | 30 | 20 | 40 |
| Ethylene/vinyl acetate copolymer I | — | 20 | 40 | 50 | 60 | 70 | 80 | — |
| Ethylene/vinyl acetate copolymer II | — | — | — | — | — | — | — | 60 |
| Conductive carbon black | 60 | 60 | 60 | 60 | 60 | 60 | 60 | 60 |
| Crosslinking agent | 1 | 1 | 1 | 1 | 1 | 1 | 1 | 1 |
| Stabilizer | 0.2 | 0.2 | 0.2 | 0.2 | 0.2 | 0.2 | 0.2 | 0.2 |
| Properties | | | | | | | | |
| Rigidity modulus of elasticity (kg/cm$^2$) | 1870 | 1220 | 650 | 580 | 450 | 280 | 205 | 460 |
| Brittle temperature (°C.) | 0 | −4 | −5 | −25 | −32 | −40 | −47 | −29 |
| Volume inherent resistivity (ohms-cm) | 12 | 13 | 13 | 30 | 41 | 81 | 195 | 19 |
| Peel strength (kg/25 mm width) | 2.0 | 1.8 | 1.6 | 1.4 | 1.3 | 2.1 | 3.5 | 2.4 |

TABLE 2

| Example (Ex.) or Comparative Example (CEx.) | Ex. 9 | Ex. 10 | Ex. 11 | Ex. 12 | Ex. 13 | CEx. 1 | CEx. 2 |
|---|---|---|---|---|---|---|---|
| Ingredients (parts by weight) | | | | | | | |
| Propylene/1-butene copolymer I | 40 | 40 | 40 | — | — | — | — |
| Propylene/1-butene copolymer II | — | — | — | 40 | — | — | — |
| Propylene/1-butene copolymer III | — | — | — | — | 40 | — | — |
| Ethylene/vinyl acetate copolymer I | — | — | — | 60 | 60 | 100 | — |
| Ethylene/vinyl acetate copolymer III | 60 | — | — | — | — | — | — |
| Ethylene/vinyl acetate copolymer IV | — | 60 | — | — | — | — | — |
| Ethylene/vinyl acetate copolymer V | — | — | 60 | — | — | — | 100 |
| Ethylene/vinyl acetate copolymer VI | — | — | — | — | — | — | — |
| Conductive carbon back | 60 | 60 | 60 | 60 | 60 | 60 | 60 |
| Crosslinking agent | 1 | 1 | 1 | 1 | 1 | 1 | 1 |
| Stabilizer | 0.2 | 0.2 | 0.2 | 0.2 | 0.2 | 0.2 | 0.2 |
| Properties | | | | | | | |
| Rigidity modulus of elasticity (kg/cm$^2$) | 550 | 750 | 910 | 590 | 380 | 94 | 350 |
| Brittle temperature (°C.) | −25 | −21 | −19 | −20 | −37 | −60 | −38 |
| Volume inherent resistivity (ohms-cm) | 13 | 12 | 20 | 35 | 42 | 216 | 290 |
| Peel strength (kg/25 mm width) | 3.0 | 3.1 | 6.8 | 1.1 | 1.9 | 8.0 | Peeling impossible |

EXAMPLES 14 TO 21

(1) Ingredients and preparations of compositions

The following ingredients were used in the proportions indicated in Table 3 and semiconducting compositions were prepared in the same way as in Example 1.

The same three propylene/1-butene random copolymers as used in Examples 1 to 13 were used.

Furthermore, the following four ethylene/acrylic acid ester copolymers were used.

Ethylene/ethyl acrylate copolymer I (A-702, a product of Mitsui Polychemical Co., Ltd.; ethyl acrylate content 6.2 mole%; melt flow rate at 190° C. 4.5 dg/min.), ethylene/ethyl acrylate copolymer II (A-703, a product of Mitsui Polychemical Co., Ltd.; ethyl acrylate content 8.5 mole%; melt flow rate at 190° C. 5.1 dg/min.), ethylene/methyl acrylate copolymer (Poly-Eth 205, a product of Gulf Oil Corporation; methyl acrylate content 6.3 mole%; melt flow rate at 190° C. 2.7 dg/min.), and ethylene/butyl acrylate copolymer (a product of Mitsui Polychemical Co., Ltd.; butyl acrylate content 8.5 mole%; melt flow rate at 190° C. 6.0 dg/min.).

The other ingredients used were the same as those used in Examples 1 to 13.

(2) Preparation and testing of samples

Samples were prepared in the same way as described in Examples 1 to 13. The rigidity moduli of elasticity, brittle temperatures and volume inherent resistivities of these samples were measured in the same way as in Examples 1 to 13. Furthermore, a test for discoloration of a copper plate was carried out in the following manner.

Copper plate discoloration test:

A sheet of the semiconducting composition was heat-bonded to a copper plate, and the bonded assembly was left to stand for 1 week in an oven at 150° C. Then, the temperature was returned to room temperature, and the sheet was peeled off from the copper plate. The peeled portion of the copper plate was observed for discoloration.

(3) Preparation and testing of a bonded sample

A bonded sample was prepared in the same way as in Examples 1 to 13, (3) by using each of the resulting semiconducting composition, and the peelability of the sample was examined in the same way as in Example 1 to 13.

(4) The results obtained in (2) and (3) are shown in Table 3. As can be seen from these results, the layers formed of the semiconducting compositions of this invention can be easily peeled off from the crosslinked polyethylene insulating layer, and no adverse effect on copper as a constituent of a power cable was observed. They have moderate flexibility and show no brittleness at low temperatures. Accordingly, they have superior characteristics as a material for forming an outside semiconducting layer of crosslinked polyethylene-insulated high-voltage power cables.

TABLE 3

| Example | 14 | 15 | 16 | 17 | 18 | 19 | 20 | 21 |
|---|---|---|---|---|---|---|---|---|
| Ingredients (parts by weight) | | | | | | | | |
| Ethylene/ethyl acrylate copolymer I | 60 | 70 | — | — | — | — | — | — |
| Ethylene/ethyl acrylate copolymer II | — | — | 40 | 60 | 60 | 60 | — | — |
| Ethylene/methyl acrylate copolymer | — | — | — | — | — | — | 60 | — |
| Ethylene/butyl acrylate copolymer | — | — | — | — | — | — | — | 60 |
| Propylene/1-butene copolymer I | 40 | 30 | 60 | 40 | — | — | 40 | 40 |
| Propylene/1-butene copolymer II | — | — | — | — | 40 | — | — | — |
| Propylene/1-butene copolymer III | — | — | — | — | — | 40 | — | — |
| Conductive carbon black | 60 | 60 | 60 | 60 | 60 | 60 | 60 | 60 |
| Crosslinking agent | 1 | 1 | 1 | 1 | 1 | 1 | 1 | 1 |
| Stabilizer | 0.2 | 0.2 | 0.2 | 0.2 | 0.2 | 0.2 | 0.2 | 0.2 |
| Properties | | | | | | | | |
| Rigidity modulus of elasticity (kg/cm$^2$) | 800 | 810 | 860 | 570 | 900 | 450 | 830 | 760 |
| Brittle temperature (°C.) | −35 | −30 | −20 | −40 | −18 | −35 | −29 | −34 |
| Volume inherent resistivity (ohms-cm) | 11 | 12 | 15 | 15 | 20 | 21 | 19 | 18 |
| Peel strength (kg/25 mm) | 1 | 2.5 | 0.7 | 2.5 | 1 | 3.6 | 3.0 | 2.7 |
| Discoloration of a copper plate | No | No | No | No | No | No | No | No |

EXAMPLES 22 TO 28

(1) Ingredients and preparation of the composition

The propylene/1-butene random copolymers indicated in Table 4 were used.

TABLE 4

| | Melt flow rate (dg/min. at 190° C.) | Propylene content (mole %) |
|---|---|---|
| Copolymer IV | 20 | 70 |
| Copolymer V | 10 | 70 |

The ethylene/vinyl acetate copolymers indicated in Table 5 were used.

TABLE 5

| | Melt flow rate (dg/min. at 190° C.) | Vinyl acetate content (mole %) |
|---|---|---|
| Copolymer I | 2.0 | 21.0 |
| Copolymer VII | 9.0 | 21.0 |

The following ingredients were also used.

Acetylene black: Denka Black, a product of Denki Kagaku Kogyo Co., Ltd.

Furnace black: Niteron 10, a product of Nittetsu Chemical Industrial Co., Ltd.

Dicumyl peroxide: Mitsui DCP, a product of Mitsui Petrochemical Co., Ltd.

Yoshinox SR: stabilizer, a product of Yoshitomi Pharmaceutical Co., Ltd.

Irganox 1076: stabilizer, a product of Japan Ciba-Geigy

DLTDP: dilauryl thiodipropionate.

TAIC: triallyl isocyanurate.

The above ingredients were used in the proportions shown in Table 6 below and kneaded on a 6-inch mixing roll whose surface temperature was kept at 120° C. to prepare semiconducting compositions.

(2) Peparation and testing of samples

The aforesaid semiconducting compositions were tested for the following properties.

Melting torque test:

Fifty-five grams of the sample was kneaded in a Brabender plastograph at 130° C. and 30 rpm, and its melting torque was determined and made a measure of extrudability.

Gel fraction:

The semiconducting composition was compression-molded at 170° C. and 100 kg/cm$^2$ for 10 minutes to prepare a sample having a thickness of 2 mm. 0.7 g of this sample was immersed for 24 hours in 100 ml of xylene at 110° C., and the proportion of the undissolved portion was measured.

Appearance of the extrudate:

The semiconducting composition was extruded into a tape form with a width of 25 mm at 130° C. using an extruder having a screw diameter of 30 mm. The appearance of the tape was evaluated visually, and rated "good" which indicates a smooth surface and "poor" which represents a rough surface.

Peelability:

A bonded sample was prepared in the same way as described in (2) of Examples 1 to 13 from the semiconducting composition prepared in (1) above. The peelability of the sample was examined by the same method as in Examples 1 to 13.

(3) The results obtained in (2) are shown in Table 6.

It is seen from Table 6 that the layers formed from the semiconducting compositions of this invention can be easily peeled off from the crosslinked polyethylene insulating layer and have good extrudability and a good appearance of the extrudate. Hence, they have superior characteristics as a material for forming an outside semiconducting layer of crosslinked polyethylene-insulated high-voltage power cables.

When the compositions of this invention are used, good extrudability, peelability and extrudate appearance can be obtained.

TABLE 6

| Example | 22 | 23 | 24 | 25 | 26 | 27 | 28 |
|---|---|---|---|---|---|---|---|
| Ingredients (parts by weight) | | | | | | | |
| Ethylene/vinyl acetate copolymer I | 75 | 65 | — | — | 70 | 70 | 70 |
| Ethylene/vinyl acetate copolymer VII | — | — | — | 60 | — | — | — |
| Ethylene/vinyl acetate copolymer II | — | — | 70 | — | — | — | — |
| Propylene/1-butene copolymer IV | 25 | 35 | 30 | 40 | 30 | 30 | — |
| Propylene/1-butene copolymer VI | — | — | — | — | — | — | 30 |
| Acetylene black | 30 | 30 | 30 | 30 | 30 | 30 | 30 |
| Furnace black | 40 | 40 | 40 | 40 | 40 | 20 | 40 |

TABLE 6-continued

| Example | 22 | 23 | 24 | 25 | 26 | 27 | 28 |
|---|---|---|---|---|---|---|---|
| Dicumyl peroxide | 1 | 1 | 1 | 1 | 1 | 1 | 1 |
| Yoshinox SR | — | — | — | — | 0.3 | — | — |
| Irganox 1076 | 0.3 | 0.3 | 0.3 | 0.3 | — | 0.3 | 0.3 |
| DLTDP | 0.2 | 0.2 | 0.2 | 0.2 | — | 0.2 | 0.2 |
| TAIC | 0.5 | 0.5 | 0.5 | 0.5 | 0.5 | 0.5 | 0.5 |
| Properties | | | | | | | |
| Melting torque (kg-m) | 3.2 | 2.9 | 3.0 | 2.3 | 3.0 | 3.2 | 3.4 |
| Peel strength (N/25 mm width) | 12 | 8 | 15 | 10 | 9 | 12 | 8 |
| Gel fraction (%) | 75 | 72 | 72 | 68 | 70 | 71 | 72 |
| Extrudate appearance | Good | Good | Good | Good | Good | Good | Good |

EXAMPLES 29 TO 36

(1) Components and pareparation of the composition

A propylene/1-butene random copolymer having a propylene content of 70 mole% and a melt flow rate of 26 dg/min. was used.

The ethylene/acrylic acid ester copolymers indicated in Table 7 were also used.

TABLE 7

| Copolymer | Acrylate | Content of the acrylate (mole %) | Melt flow rate (dg/min. at 190° C.) |
|---|---|---|---|
| III | Ethyl ester | 16.3 | 6.4 |
| IV | Methyl ester | 16.0 | 2.0 |
| V | Butyl ester | 16.0 | 2.5 |
| VI | Ethyl ester | 13.0 | 21.0 |

The following ingredients were also used.

Acetylene black: Denka Black, a product of Denki Kagaku Kogyo K.K.

Furnace black: Niteron 10, a product of Nittetsu Chemical Industrial Co., Ltd.

Peroxide crosslinking agent: 1,3-bis(tert.butyl peroxyisopropyl)benzene, Parkadox 14, a product of Kayaku Noury Corporation.

Yoshinox SR: stabilizer, a product of Yoshitomi Pharmaceutical Co., Ltd.

Irganox 1076: stabilzier, a product of Japan Ciba-Geigy.

DLTDP: dilauryl thiodipropionate.

TAIC: triallyl isocyanurate.

These ingredients were used in the proportions shown in Table 8 and semiconducting compositions were prepared in the same way as in Examples 22 to 28.

(2) Preparation and testing of the sample

Using the semiconducting compositions, the same procedure as in Example 22 to 28, (2) was repeated.

(3) The results obtained in (2) above are shown in Table 8.

It is seen from the results given in Table 8 that the layers formed from the semiconducting compositions of this invention can be easily peeled off from the crossslinked polyethylene insulating layer and that these compositions have good extrudability and give extrudates having a good appearance. Hence, they have superior characteristics as a material for forming the outside semiconducting layers of crosslinked polyethylene-insulated high-voltage power cables. Furthermore, when the compositions in accordance with this invention are used, good extrudability, peelability and extrudate appearance can be obtained.

TABLE 8

| Example | 29 | 30 | 31 | 32 | 33 | 34 | 35 | 36 |
|---|---|---|---|---|---|---|---|---|
| Ingredients (parts by weight) | | | | | | | | |
| Ethylene/vinyl acrylate copolymer III | 80 | 70 | 60 | 70 | 70 | — | — | — |
| Ethylene/vinyl acrylate copolymer IV | — | — | — | — | — | 70 | — | — |
| Ethylene/vinyl acrylate copolymer V | — | — | — | — | — | — | 70 | — |
| Ethylene/vinyl acrylate copolymer VI | — | — | — | — | — | — | — | 60 |
| Propylene/1-butene copolymer I | 20 | 30 | 40 | 30 | 30 | 30 | 30 | 40 |
| Acetylene black | 30 | 30 | 30 | 50 | 30 | 30 | 30 | 30 |
| Furnace black | 40 | 40 | 40 | 20 | 40 | 40 | 40 | 40 |
| Peroxide crosslinking agent | 0.8 | 0.8 | 0.8 | 0.8 | 0.8 | 0.8 | 0.8 | 0.8 |
| Yoshinox SR | — | — | — | — | 0.3 | — | — | — |
| Irganox 1076 | 0.3 | 0.3 | 0.3 | 0.3 | — | 0.3 | 0.3 | 0.3 |
| DLTP | 0.2 | 0.2 | 0.2 | 0.2 | — | 0.2 | 0.2 | 0.2 |
| TAIC | 0.5 | 0.5 | 0.5 | 0.5 | 0.5 | 0.5 | 0.5 | 0.5 |
| Properties | | | | | | | | |
| Melting torque (kg-m) | 3.5 | 3.2 | 2.8 | 3.5 | 3.4 | 3.4 | 3.3 | 2.8 |
| Peel strength (N/25 mm width) | 35 | 9 | 8 | 13 | 10 | 10 | 11 | 10 |
| Gel fraction (%) | 80 | 68 | 63 | 71 | 65 | 67 | 69 | 60 |
| Extrudate appearance | Good | Good | Good | Good | Good | Good | Good | Good |
| Discoloration of a copper plate | No | No | No | No | No | No | No | No |

What is claimed is:

1. In a power cable composed at least of a central conductor, a crosslinked polyethylene insulating layer surrounding the conductor and an outside semiconducting layer surrounding the insulating layer, the improvement wherein the outside semiconducting layer is formed of a semiconducting composition or its crosslinked product, said composition comprising (A) a random copolymer of propylene and an alpha-olefin having at least 4 carbon atoms as main constituents, said copolymer containing 50 to 87 mole%, based on the entire recurring units, of the propylene units, and (B) fine particles of carbon black in an amount sufficient for the composition to have a volume inherent resistivity of $10^0$ to $10^6$ ohms-cm at 23° C.

2. The cable of claim 1 wherein the semiconducting composition further comprises (C) at least one random copolymer selected from the group consisting of a random copolymer of ethylene and a vinyl ester having 4 or 5 carbon atoms as main constituents, said copolymer containing at least about 5.4 mole%, based on the entire recurring units, of the vinyl ester units, and a random copolymer of ethylene and an unsaturated carboxylic acid ester having 4 to 8 carbon atoms as main constituents, said copolymer containing at least 3 mole%, based on the entire recurring units, of the unsaturated carboxylic acid ester units.

* * * * *